United States Patent [19]

Harris et al.

[11] Patent Number: 5,439,059
[45] Date of Patent: Aug. 8, 1995

[54] AQUEOUS GEL FLUIDS AND METHODS OF TREATING SUBTERRANEAN FORMATIONS

[75] Inventors: Phillip C. Harris; Lewis R. Norman, both of Duncan, Okla.

[73] Assignee: Halliburton Company, Duncan, Okla.

[21] Appl. No.: 209,381

[22] Filed: Mar. 8, 1994

[51] Int. Cl.6 .......................................... E21B 43/267
[52] U.S. Cl. ........................... 166/300; 166/308; 507/211; 507/260; 507/924
[58] Field of Search ............... 166/280, 300, 308; 252/8.554; 507/211, 215, 216, 217, 260, 922, 924

[56] References Cited

U.S. PATENT DOCUMENTS

| | | | |
|---|---|---|---|
| Re. 32,302 | 12/1986 | Almond et al. | 166/308 |
| 3,378,074 | 4/1968 | Kiel | 166/308 |
| 3,455,390 | 7/1969 | Gallus | 166/308 X |
| 3,601,198 | 8/1971 | Ahearn et al. | 166/308 |
| 4,326,969 | 4/1982 | Hunter . | |
| 4,359,391 | 11/1982 | Salathiel et al. . | |
| 4,453,596 | 6/1984 | Conway et al. | 166/278 |
| 4,464,270 | 8/1984 | Hollenbeak et al. . | |
| 4,480,696 | 11/1984 | Almond et al. | 166/308 |
| 4,563,291 | 1/1986 | Penny . | |
| 4,627,495 | 12/1986 | Harris et al. | 166/280 |
| 4,649,999 | 3/1987 | Sandy et al. | 166/295 |
| 4,799,550 | 1/1989 | Harris et al. | 166/300 |
| 5,165,479 | 11/1992 | Harris et al. | 166/300 |
| 5,186,847 | 2/1993 | Cole et al. | 252/8.551 |
| 5,233,032 | 8/1993 | Zody et al. | 252/8.551 X |
| 5,256,651 | 10/1993 | Phelps et al. | 252/8.551 X |

OTHER PUBLICATIONS

N. I. Sax and R. J. Lewis, Sr., Hawley's Condensed Chemical Dictionary (Eleventh Edition), pp. 423–424, 1987, Van Nostrand Reinhold Co.

Primary Examiner—George A. Suchfield
Attorney, Agent, or Firm—Robert A. Kent; Cliff Dougherty, III

[57] ABSTRACT

A gel fluid for treating a subterranean formation penetrated by a well bore including an aqueous liquid, an organic gelling agent and at least about 0.05% by weight, based on the weight of the aqueous liquid, of a broken gel fragment stabilizer. The gel fluid can optionally include crosslinking agents, proppant materials, pH buffers and other components. The broken gel fragment stabilizer is a dialkyl sulfosuccinate that has dispersing properties sufficient to diminish the propensity of broken gel fragments formed when the gel fluid breaks to agglomerate. Also provided is a method of treating a subterranean formation penetrated by a well bore. The inventive gel fluid and method are particularly suitable for fracturing a subterranean formation to stimulate the production of hydrocarbons therefrom.

16 Claims, 1 Drawing Sheet

AQUEOUS GEL FLUIDS AND METHODS OF TREATING SUBTERRANEAN FORMATIONS

BACKGROUND OF THE INVENTION

1. Field of the Invention

The present invention relates generally to the treatment of subterranean formations penetrated by well bores using aqueous gel fluids. In one embodiment, the invention relates specifically to the use of high viscosity aqueous gel fluids to fracture subterranean formations in order to stimulate the production of hydrocarbons therefrom.

2. Description of the Prior Art

Aqueous gel fluids are used to treat subterranean formations penetrated by well bores in a variety of ways. For example, such fluids are commonly used to temporarily plug or block a portion of a formation to allow a gravel pack to be placed or some other operation to be carried out in the formation. Aqueous gel fluids are also commonly used to fracture subterranean formations in order to stimulate the production of fluids, such as petroleum, therefrom.

In a fracturing treatment, an aqueous gel fluid is injected down the well bore at a flow rate and pressure sufficient to develop hydraulic forces which form a fracture in the formation. The gel quality of the fluid aids in the suspension of proppant material, e.g., sand, in the fluid and the formation of the fracture. Elevated pressure is maintained on the fluid for a sufficient time to cause movement of the fluid into the fracture and thereby propagate or extend the fracture into the formation. The proppant material in the fluid holds the fracture open upon release of the pressure. Crosslinking agents are typically used to increase the viscosity of the fluid which facilitates transport and placement of the proppant material and the formation of an extended fracture.

Regardless of the type of treatment, it is generally desirable to recover the aqueous gel fluid from the formation once the treatment is complete and prior to initiating or resuming production. In order to recover the fluid, it is often necessary to first reduce the viscosity of the fluid by causing or allowing the gelling agents in the fluid to break down. This process is commonly referred to as breaking the gel or breaking the aqueous gel fluid. The process can be accomplished by a number of methods. For example, breakers consisting of mild oxidizing agents or enzymes can be included in the aqueous gel fluid to break the fluid at a certain time. The breaking time can generally be predicted within relatively narrow limits. In high temperature applications, the aqueous gel fluid will often break on its own over time. Once the fluid is broken, it is recovered from the formation by way of the well bore.

Unfortunately, the process of breaking the aqueous gel fluid creates very small (e.g., microscopic) broken gel fragments (gel residue) which tend to agglomerate or flocculate and form relatively large broken gel masses. These masses can severely damage the formation. For example, the masses can plug proppant packs formed in fractures severely reducing the fracture flow capacity of the formation. Also, oil present when the gel fluid is broken can be incorporated into the masses leaving the broken gel fragments oil-wet. The oil-wet nature of the fragments aggravates the problem and gives the broken gel fluid an extremely dirty, damaging appearance.

There is a need for an aqueous gel fluid and method of treating a subterranean formation with the same in which broken gel fragments formed when the fluid breaks do not decrease the effectiveness of the treatment.

SUMMARY OF THE INVENTION

By the present invention, it has been discovered that the problems caused by agglomeration of broken gel fragments formed when an aqueous gel fluid breaks can be eliminated or at least substantially reduced by incorporating a specific type of surfactant into the gel fluid. The surfactant has dispersing properties sufficient to diminish the propensity of the broken gel fragments to agglomerate in the first place and thereby prevent the fragments from being entrapped by proppant material or other porous structure in the formation. By preventing the broken gel fragments from agglomerating, the fragments remain dispersed in the fluid and pass through the proppant material or other structure therewith upon recovery of the fluid from the formation. The surfactant leaves the broken gel fragments dispersed in a water-wet condition which maximizes fluid production through the proppant material or other structure.

Accordingly, in a first aspect, the present invention is a gel fluid for treating a subterranean formation penetrated by a well bore. The gel fluid comprises an aqueous liquid, an organic gelling agent present in an amount sufficient to gel the aqueous liquid, and at least about 0.05% by weight, based on the weight of the aqueous liquid, of a broken gel fragment stabilizer. The broken gel fragment stabilizer is a dialkyl sulfosuccinate that has dispersing properties sufficient to diminish the propensity of broken gel fragments formed when the gel fluid breaks to agglomerate and prevent the fragments from being entrapped in the formation upon recovery of the fluid from the formation. The composition can optionally include a crosslinking agent soluble in the aqueous liquid and present in an amount sufficient to crosslink at least a portion of the gelling agent and other components such as crosslinking inhibitors, pH buffers, proppant material, foaming agents, gas components and the like.

In another aspect, the invention is a method of treating a subterranean formation penetrated by a well bore to stimulate the production of hydrocarbons therefrom. The method includes the steps of contacting the formation with a gel fluid, breaking the gel fluid, and recovering the broken gel fluid from the formation. The gel fluid used in the method is the inventive gel fluid described above. The broken gel fragment stabilizer must be admixed with the aqueous liquid and organic gelling agent before the gel fluid breaks.

The inventive gel fluid and method are particularly useful for fracturing a subterranean formation penetrated by a well bore and depositing proppant material in the fracture(s) to keep the fracture(s) open whereby the flow of hydrocarbons through the formation is increased. The broken gel fragment stabilizing agent of the inventive gel fluid diminishes the propensity of broken gel fragments formed when the gel fluid breaks to agglomerate thereby preventing the fragments from being entrapped by the proppant material and clogging the porous structure formed thereby. The fracture conductivity is increased.

It is, therefore, a principal object of the present invention to provide a gel fluid and method of treating a subterranean formation with the same in which broken gel fragments formed when the fluid breaks do not decrease the effectiveness of the treatment or damage the formation.

Numerous other objects, features and advantages of the present invention will be readily apparent to those skilled in the art upon a reading of the following disclosure including the accompanying examples.

DESCRIPTION OF PREFERRED EMBODIMENTS

Figure 1:
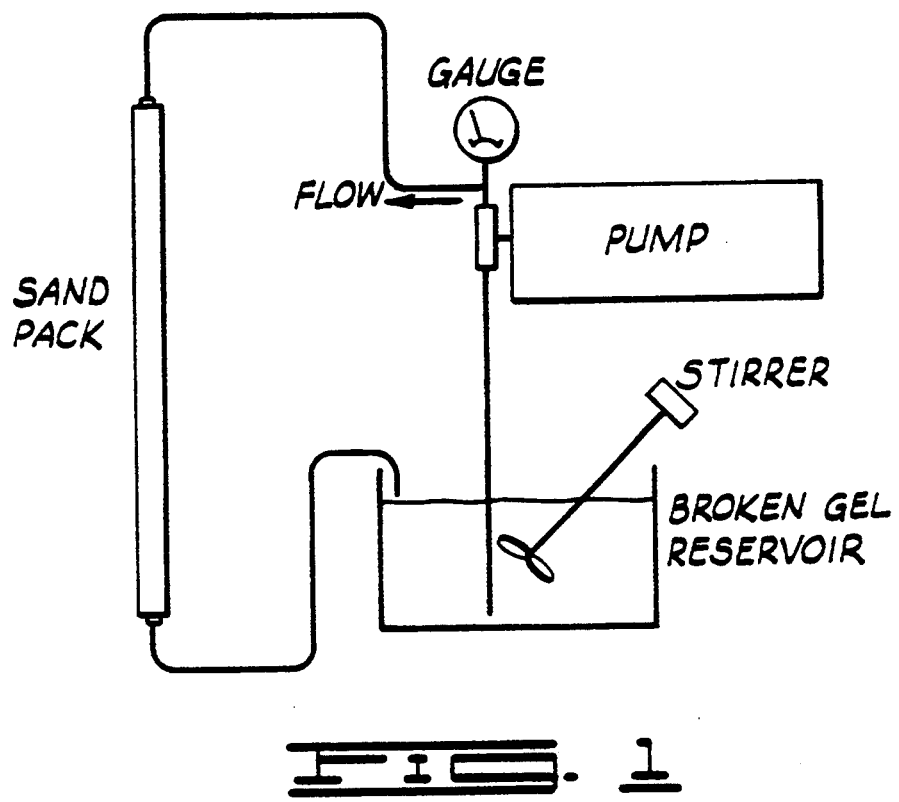
FIG. 1 is a diagram of apparatus used in carrying out the tests described in Example 1.

The present invention includes a gel fluid for and method of treating a subterranean formation penetrated by a well bore. Although the inventive gel fluid and method are potentially useful in any application in which an aqueous gel fluid is used to treat a subterranean formation and then broken and recovered from the formation, they are particularly suitable for use in fracturing a subterranean formation to stimulate the production of hydrocarbons therefrom.

The inventive gel fluid comprises an aqueous liquid, an organic gelling agent present in an amount sufficient to gel the aqueous liquid, and at least about 0.05% by weight, based on the weight of the aqueous liquid, of a broken gel fragment stabilizer.

The aqueous liquid of the inventive gel fluid can comprise substantially any aqueous liquid which does not adversely react with the other components of the gel fluid. Suitable aqueous liquids include, for example, fresh water and salt solutions. Preferably, the aqueous liquid is a salt solution consisting of fresh water and about 2% by weight, based on the weight of the water, of potassium chloride or some other salt which functions to stabilize the formation being treated.

The organic gelling agent of the inventive gel fluid can be any of a variety of hydratable organic compounds. Preferably, the gelling agent is a derivatized natural material such as guar gum or cellulose. Examples of preferred gelling agents include guar, hydroxypropylguar, carboxymethylguar, carboxymethylhydroxyethylguar, carboxymethylhydroxypropylguar, hydroxyethylcellulose, carboxymethylhydroxyethylcellulose, carboxymethylhydroxypropylcellulose, and the like. Of these, guar, hydroxypropylguar, carboxymethylhydroxypropylguar, hydroxyethylcellulose, and carboxymethylhydroxyethylcellulose are more preferred. The broken gel fragment stabilizer is particularly effective with respect to these agents. The broken gel fragment stabilizer is most effective with respect to guar and guar derivative gelling agents.

The above-described organic gelling agents are hydrated by the aqueous liquid and form a gel therewith. Preferably, the gelling agent is present in the inventive gel fluid in an amount of from about 10 pounds to about 80 pounds per 1000 gallons of the aqueous liquid, more preferably in an amount of from about 20 pounds to about 50 pounds per 1000 gallons of the aqueous liquid. The exact amount of gelling agent employed depends on the type of gelling agent, the desired viscosity of the fluid, the formation temperature and other factors as known to those skilled in the art.

The broken gel fragment stabilizer of the inventive gel fluid is a dialkyl sulfosuccinate that has dispersing properties sufficient to diminish the propensity of gel fragments formed when the gel fluid breaks to agglomerate and prevent the fragments from being entrapped in the formation upon recovery of the gel fluid from the formation. The dialkyl sulfosuccinate is compatible with the remaining components of the fluid and soluble in the aqueous liquid. The broken gel fragment stabilizer of the inventive gel fluid is preferably a dialkyl sulfosuccinate wherein each alkyl group has from 5 to 18 carbon atoms, more preferably a dialkyl sulfosuccinate wherein each alkyl group has from 8 to 15 carbon atoms. Dioctyl sulfosuccinates are most preferred. Examples of dioctyl sulfosuccinates include dioctyl sodium sulfosuccinate, dioctyl potassium sulfosuccinate and dioctyl ammonium sulfosuccinate. Of these, dioctyl sodium sulfosuccinate is more economical and therefore most preferred. Dioctyl sodium sulfosuccinate, also referred to as di(2-ethylhexyl) sodium sulfosuccinate, can be represented by the following formula:

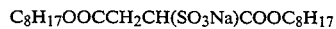

$$C_8H_{17}OOCCH_2CH(SO_3Na)COOC_8H_{17}$$

The broken gel fragment stabilizer is preferably included in the gel fluid in an amount in the range of from about 0.05% to about 2% by weight, most preferably from about 0.1% to about 0.5% by weight, based on the weight of the aqueous liquid.

In most applications, it is desirable to increase the viscosity of the inventive gel fluid by including one or more crosslinking agents therein. The crosslinking agent increases the viscosity of the gel fluid by reacting with the gelling agent. It increases the effective molecular weight of the polymer mass. A variety of cross-linking compounds can be employed including crosslinking agents that cause an initial increase in the viscosity of the gel fluid and delayed crosslinking agents, i.e., agents that do not substantially react with the gelling agent and increase the viscosity of the fluid until the fluid contacts the formation. For example, suitable crosslinking agents include zirconium IV (valence of +4) containing compounds which are soluble in the gel fluid and capable of forming a crosslinked structure with the gelling agent used. Compounds which supply zirconium IV ions are, e.g., zirconium lactate, zirconium carbonate, zirconium acetylacetonate and zirconium diisopropylamine lactate. Of the foregoing compounds, zirconium lactate is preferred. Additional crosslinking agents suitable for use in the inventive gel fluid include boron compounds such as boric acid, disodium octaborate tetrahydrate, sodium diborate and pentaborates, and titanium IV containing compounds such as titanium ammonium lactate, titanium triethanol amine and titanium acetylacetonate. The exact type and amount of crosslinking agent(s) used depends on the type of polymer to be crosslinked, involved temperature conditions and other factors as known to those skilled in the art.

It is often also desirable to include a buffer in the inventive gel fluid to adjust the pH to and/or maintain the pH at a certain level in order to enhance the effectiveness of the gelling agent and/or crosslinking agent under the temperature and other conditions involved. For example, when crosslinking compounds containing zirconium IV ions are utilized, a buffer is preferably included in the gel fluid to maintain the pH of the fluid at a level of about 5 or above. When the zirconium crosslinking agent is combined with the aqueous liquid and gelling agent, a crosslinking reaction takes place that is very slow at ambient temperature and is therefore delayed. When the aqueous gel is heated by the formation, the crosslinking reaction takes place at a relatively rapid rate. While various buffers can be utilized, particularly suitable buffers are sodium diacetate and a mixture of a weak acid such as acetic acid and sodium carbonate.

In most applications, it is also desirable to include one or more breakers in the inventive gel fluid to cause the fluid to break once the desired treatment has been carried out. Although the fluid will often break on its own in high temperature applications, the addition of one or more breakers allows the breaking time to be predicted within relatively narrow limits. A variety of breakers can be used. Mild oxidizing agents are useful when the formation temperature is relatively high. Suitable oxidizing agents are sodium persulfate, potassium persulfate and ammonium persulfate. For crosslinked gel fluids used at temperatures below about 140° F., enzymes are preferred. Suitable enzymes include alpha and beta amylases, amyloglucosidase, oligoglucosidase, invertase, maltase, cellulase, and hemicellulase. The specific breaker(s) utilized as well as the amount thereof employed depends on the breaking time desired, the nature of the gelling agent(s) and crosslinking agent(s), formation characteristics and conditions, and other factors as known to those skilled in the art.

When the inventive gel fluid is used to fracture a subterranean formation, one or more propping agents are preferably included in the fluid. Examples of propping agents that can be used include sand, resin coated sand, sintered bauxite, various ceramic compounds, glass beads and the like. The propping agent is generally used in a concentration in the range of from about 1 to about 24 pounds per gallon of the aqueous liquid; however, higher or lower concentrations can be used as required. The particular size of the propping agent used depends on the nature of the formation to be stimulated, the pumping fluid rates as well as other known factors. Particle sizes generally are in the range of from about 10 to 200 mesh in the U.S. Sieve Series scale. Porous structures formed of propping agents of larger particle size are generally less susceptible to plugging problems.

Additional components can be included in the inventive gel fluid to enhance the viscosity of the fluid or otherwise modify properties of the fluid for the particular application involved. For example, nitrogen and/or carbon dioxide can be included in the fluid to reduce the water content of and energize the fluid in order to make it easier to recover the fluid and minimize damage to the formation. Further additives that can be used include foaming agents, gel stabilizers, friction reducers, fluid loss agents, clay control agents and bactericides.

An example of an embodiment of the inventive gel fluid particularly suitable for fracturing a subterranean formation that is associated with relatively low temperatures comprises an aqueous liquid consisting of fresh water and 2% by weight, based on the weight of the water, of potassium chloride; from about 20 pounds to about 50 pounds of carboxymethylhydroxypropylguar per 1000 pounds of the aqueous liquid; from about 0.9% to about 2.3% by weight, based on the weight of the carboxymethylhydroxypropylguar, of zirconium lactate; an amount of sodium diacetate sufficient to adjust the pH of the fluid to a range of from about 5.0 to about 6.0; from about 0.1% to about 0.5% by weight, based on the weight of the aqueous liquid, of dioctyl sodium sulfosuccinate; from about 1 pound to about 24 pounds per gallon of the aqueous liquid of a propping agent, e.g., sand; and from about 0.01% to about 0.1% by weight, based on the weight of the carboxymethylhydroxypropylguar, of hemicellulase (an enzyme breaker).

In carrying out the inventive method, the inventive gel fluid is first prepared. The gel fluid is prepared on the surface by admixing the organic gelling agent with the aqueous liquid whereby the gelling agent is hydrated and an aqueous gel is formed. The broken gel fragment stabilizer and any other components employed such as crosslinking agents, breakers, propping agents and the like are then added to the aqueous gel. The components can be batch mixed or mixed "on the fly" as the fluid is injected down the well bore. The gel fluid is then contacted with the formation and the desired treatment is carried out. The well can be shut-in as necessary. For example, in fracturing a formation, the gel fluid is pumped through the well bore into the formation at a rate and pressure sufficient to form one or more fractures in the formation and deposit a propping agent included in the fluid in the formation. Pumping can be continued to extend the fracture(s) formed and deposit additional propping agent therein. The propping agent keeps the fracture(s) open upon release of the pressure whereby hydrocarbons in the formation can flow through the formation to the well bore.

After the desired treatment has been carried out, it is generally necessary to reduce the viscosity of the inventive gel fluid so that it can be recovered (pumped or produced) from the formation through the well bore. The viscosity of the gel fluid is reduced by breaking the fluid. As used herein and in the appended claims, breaking the fluid means causing or allowing the gelling agents in the fluid to break down thereby reducing the viscosity of the fluid. There are various methods available for breaking the gel fluid of the present invention. Depending upon the involved temperature conditions and the types of gelling agents and other components employed, the inventive gel fluid can often be allowed to merely break on its own over time. For example, formation temperatures of 200° F. or greater will generally cause the gel fluid to break on its own within a short amount of time. In any event, as discussed above, the inventive gel fluid preferably includes one or more breakers such as a mild oxidizing agent or an enzyme which allows the breaking time to be predicted within relatively narrow limits. The inventive gel fluid can also often be broken by adding a conventional acidic solution to the formation. This method is convenient when it is desirable to further increase the fracture conductivity in a desired region of the formation.

When the gel fluid breaks, very small broken gel fragments (possibly including crosslinking agent residue) are formed. As discussed above, these fragments tend to agglomerate or flocculate and form larger broken gel masses which can plug proppant packs, gravel packs and so forth.

The broken gel fragment stabilizer of the inventive gel fluid prevents the broken gel fragments from agglomerating. The fragments remain dispersed throughout the broken gel fluid and pass through the proppant packs or other porous structure in the formation therewith. The broken gel fluid including the fragments is produced back through the well bore to the surface.

The broken gel fragment stabilizer utilized in the inventive gel fluid does not adversely react with the other components of the gel fluid and is effective at temperatures, pH levels and other conditions normally associated with the use of aqueous gel fluids. The broken gel fragment stabilizer is particularly effective in preventing agglomeration of broken gel fragments in the presence of oil. It inhibits agglomeration of and effectively disperses oil wet broken gel fragments. The fragments are left in water-wet condition.

In order to further illustrate the compositions and methods of the present invention, the following examples are given.

EXAMPLE I

Tests were carried out to evaluate the flow of various broken gel fluids through sand packs. The effect of the inventive broken gel fragment stabilizer was analyzed.

Various gel fluid samples were first prepared. Each sample was prepared by admixing a gelling agent (guar or hydroxypropylguar), an enzyme breaker (hemicellulase) and optionally a broken gel fragment stabilizer with an aqueous solution consisting of water and 2% by weight potassium chloride, based on the weight of the water, to form a base gel. The base gel was then cross-linked by adding disodium octaborate tetrahydrate thereto. The broken gel fragment stabilizer used was dioctyl sodium sulfosuccinate.

Each gel fluid sample was then broken. The pH of some of the samples was adjusted to below 9 in order to allow the enzyme to break the gel. The pH was adjusted by adding acetic acid thereto.

The tests were carried out by pumping the broken gel fluid samples through a vertical sand pack column and monitoring the pump pressure versus time to give an indication of plugging of the sand pack. The column was constructed of schedule 40 PVC pipe that had a 1.5 inch inner diameter and was 4.0 feet long. Pressure fittings were attached, and a tubing run to a recirculating pump.

In carrying out each test, the column was packed with approximately 2,940 grams of 20/40 mesh dry Ottawa sand. Approximately 2 liters of the broken gel fluid sample being tested were then pumped from a stirred gel reservoir into the top of the vertical sand pack. A line from the bottom of the pipe returned fluid to the gel reservoir. As stated above, pump pressure was monitored versus time to give an indication of plugging of the sand pack. A pressure of 200 psi was the maximum allowable, and thus was established as the condition of plugging. FIG. 1 of this application is a diagram of the test apparatus.

The results of the tests are shown by Tables 1-4 below.

TABLE 1

Gel Fluid - HPG*
Sand Mesh - 20/40 (Ottawa)
Surfactant - None

| Time (min.) | Pressure (psi) | Flow Rate (ml/min) |
| --- | --- | --- |
| 0 | 40 | 176 |
| 7 | 65 | 176 |
| 9 | 80 | 176 |
| 11 | 130 | 176 |
| 12 | 150 | 176 |
| 13 | 170 | 176 |

TABLE 1-continued

Gel Fluid - HPG*
Sand Mesh - 20/40 (Ottawa)
Surfactant - None

| Time (min.) | Pressure (psi) | Flow Rate (ml/min) |
| --- | --- | --- |
| 14 | 200 | 176 |

*40.0 lb/Mgal of hydroxypropylguar (a solution consisting of hydroxypropylguar in a diesel slurry was used in an amount sufficient to impart 40.0 lb/Mgal of hydroxypropylguar to the gel fluid); 6.00 lb/Mgal of disodium octaborate tetrahydrate; 0.62 gal/Mgal of an aqueous solution containing about 25% by weight potassium carbonate; and 1.5 lb/Mgal hemicellulase.

TABLE 2

Gel Fluid - Guam*
Sand Mesh - 20/40 (Ottawa)
Surfactant - None

| Time (min.) | Pressure (psi) | Flow Rate (ml/min) |
| --- | --- | --- |
| 0 | 40 | 146 |
| 1 | 60 | 146 |
| 2 | 70 | 146 |
| 3 | 90 | 146 |
| 4 | 105 | 146 |
| 5 | 120 | 142 |
| 6 | 150 | 142 |
| 7 | 165 | 142 |
| 8 | 185 | 142 |
| 9 | 200 | 136 |

*40.0 lb/Mgal of guar (a solution consisting of guar in a diesel slurry was used in an amount sufficient to impart 40.0 lb/Mgal of guar to the gel fluid); 2.0 lb/Mgal of disodium octaborate tetrahydrate; 0.5 gal/Mgal of an aqueous solution containing about 25% by weight potassium carbonate; and 1.5 lb/Mgal hemicellulase.

TABLE 3

Gel Fluid - Guar*
Sand Mesh - 20/40 (Ottawa)
Surfactant - dioctyl sodium sulfosuccinate

| Time (min.) | Pressure (psi) | Flow Rate (ml/min) |
| --- | --- | --- |
| 0 | 20 | 200 |
| 1 | 20 | |
| 2 | 25 | |
| 4 | 30 | 198 |
| 10 | 50 | 190 |
| 15 | 65 | |
| 20 | 75 | 176 |
| 25 | 90 | |
| 30 | 95 | |
| 35 | 105 | |
| 40 | 108 | |
| 50 | 115 | |
| 75 | 115 | 176 |
| 90 | 115 | 176 |
| 105 | 115 | 176 |

*40.0 lb/Mgal of guar (a solution consisting of guar in a diesel slurry was used in an amount sufficient to impart 40.0 lb/Mgal of guar to the gel fluid); 2.0 lb/Mgal of disodium octaborate tetrahydrate; 0.5 gal/Mgal of an aqueous solution containing about 25% by weight potassium carbonate; 6.5 lb/Mgal hemicellulase; and 10.0 gal/Mgal dioctyl sodium sulfosuccinate.

TABLE 4

Gel Fluid - HPG*
Sand Mesh - 20/40 (Ottawa)
Surfactant - dioctyl sodium sulfosuccinate

| Time (min.) | Pressure (psi) | Flow Rate (ml/min) |
| --- | --- | --- |
| 0 | 15 | 180 |
| 1 | 15 | |
| 7 | 15 | 172 |
| 10 | 15 | 192 |
| 18 | 20 | 184 |
| 25 | 20 | |
| 45 | 20 | |
| 50 | 24 | 160 |
| 55 | 22 | 172 |

TABLE 4-continued

Gel Fluid - HPG*
Sand Mesh - 20/40 (Ottawa)
Surfactant - dioctyl sodium sulfosuccinate

| Time (min.) | Pressure (psi) | Flow Rate (ml/min) |
|---|---|---|
| 60 | 25 | |
| 80 | 25 | 172 |
| 105 | 25 | 172 |

*40.0 lb/Mgal of hydroxypropylguar (a solution consisting of hydroxypropylguar in a diesel slurry was used in an amount sufficient to impart 40.0 lb/Mgal of hydroxypropylguar to the gel fluid); 6.0 lb/Mgal of disodium octaborate tetrahydrate; 0.5 gal/Mgal of an aqueous solution containing about 25% by weight potassium carbonate; 6.5 lb/Mgal hemicellulase; and 10.0 gal/Mgal dioctyl sodium sulfosuccinate.

The amounts of components listed in connection with Tables 1–4 are based on the amount of the corresponding component per 1000 gallons of the potassium chloride solution. The plugging tendencies of broken borate crosslinked guar versus broken borate crosslinked hydroxypropylguar are illustrated by Tables 1 and 2, respectively. Although the guar plugged the sand pack slightly faster than the hydroxypropylguar (9 versus 13 minutes), it is believed that the difference may be within experimental error.

As shown by Tables 3 and 4, the use of 10.0 gallons per 1000 gallons of the potassium chloride solution of a broken gel fragment stabilizer consisting of a dioctyl sodium sulfosuccinate diminished the propensity of broken gel fragments to agglomerate and prevented the fragments from being entrapped in the sand pack. The broken gel fragments remained dispersed throughout the fluids which prevented the pore spaces of the sand packs from becoming clogged. In the absence of the broken gel fragment stabilizer, the pumping pressure rose dramatically indicating plugging of the sand pack.

EXAMPLE II

Tests were carried out to determine the effectiveness of various surfactants in diminishing the propensity of broken gel fragments formed when gel fluids break to agglomerate.

Various samples of aqueous gel fluids were first prepared by admixing an aqueous solution consisting of water and 2% by weight, based on the weight of the water, of potassium chloride ("the aqueous liquid") with 40 lbs. per 1000 gallons of the aqueous liquid of hydroxypropylguar, approximately 1.2 gallons per 1000 gallons of the aqueous liquid of a delayed triethanol amine titanate crosslinking agent, approximately 3% by volume based on the volume of the aqueous liquid of diesel oil, 0.5 lbs. per 1000 gallons of the aqueous liquid of a selected breaker, and 1.0% by weight based on the weight of the aqueous liquid of a selected surfactant. The components were admixed using a Waring blender.

Each sample was then placed in a jar which was placed in a water bath for a specific amount of time. The temperature of the water bath was adjusted according to the type of breaker used.

Following incubation (fluid breaking), the jars were removed from the water bath and observed visually. The samples were analyzed for emulsion properties, fluid character, fluid color, and broken gel fragment character.

The surfactants used in the tests were as follows:
A—a trialkyl benzylammonium chloride;
B—a linear alkyl ethoxylated alcohol;
C—an alpha olefin sulfonate;
D—an imidazoline;
E—dioctyl sodium sulfosuccinate;
F—a cocobetaine;
G—a phenol-formaldehyde nonionic resin blend;
H—an alkyl sulfonate;
I—a branched alkyl ethoxylated alcohol;
J—an alkyl trimethylammonium chloride; and
K—an alkyl benzyl sulfonate.

The results of the tests are shown by Tables 5 and 6 below.

TABLE 5

Breaker - Enzyme[1]
Water Bath - 2 hrs. at 130° F.
and overnight at room temperature

| Surfactant | Cross-linking Agent | Top Layer | Broken Gel Fluid Character | Fluid Color | Gel Fragment Character |
|---|---|---|---|---|---|
| A | yes | none | strong XL[2] | white | uniform |
| B | yes | none | stringy XL[3] | white | uniform |
| C | yes | none | stringy XL[3] | white | uniform |
| None | no | ¾" | thin[4] | colorless | easily dispersed |
| None | yes | none | stringy XL[3] | white | uniform |
| D | yes | none | strong XL[2] | lt. yellow | uniform |
| E | yes | none | thin[4] | white | uniform |
| F | yes | none | stringy XL[3] | white | uniform |
| G | yes | none | strong XL[2] | white | residue at top |
| H | yes | slight | thin[4] | lt. yellow | uniform |
| I | yes | none | stringy XL[3] | white | uniform |
| J | yes | ½" foam | strong XL[2] | white | not broken |
| K | yes | ¾" | thin[4] | brown | not easily dispersed |

[1]hemicellulase
[2]The fluid was highly viscous indicating that the fluid was not broken.
[3]The fluid was slightly viscous indicating that the fluid was only partially broken. Broken gel fragments were poorly dispersed.
[4]The fluid was not viscous indicating a complete breakdown of the fluid had occurred.

TABLE 6

Breaker - Oxidizing[1]
Water Bath - Overnight at 135° F.

| Surfactant | Cross-linking Agent | Top Layer | Broken Gel Fluid Character | Fluid Color | Fragment Character |
|---|---|---|---|---|---|
| A | yes | none | strong XL[2] | white | uniform |
| B | yes | ⅜" oil | thin[4] | white | slightly lumpy |
| C | yes | ¾" foam + gel | thin[4] | clear | lumpy |
| None | yes | ¼" | thin[4] | colorless | lumpy |
| D | yes | none | strong XL[2] | white | uniform |
| E | yes | ¼" oil + gel | thin[4] | clear | lightly lumpy, easily disperses |
| F | yes | 1¼" | thin[4] | colorless | slightly lumpy, some dispersal |
| G | yes | 1⅜" | stringy XL[3] | white | coagulated |
| H | yes | 1¾" | stringy XL[3] | yellow | slightly lumpy, some dispersal |
| I | yes | ¼" oil + gel | thin[4] | clear | lumpy |
| J | yes | foam | strong XL[2] | white | uniform |
| K | yes | 2½" | thin[4] | brown | lumpy |

[1]sodium dioxypersulfate
[2]The fluid was highly viscous indicating that the fluid was not broken.
[3]The fluid was slightly viscous indicating that the fluid was only partially broken. Broken gel fragments were poorly dispersed.
[4]The fluid was not viscous indicating a complete breakdown of the fluid had occurred.

As shown by Tables 5 and 6, only surfactant E, the dioctyl sodium sulfosuccinate, gave a complete break with both types of breakers, and resulted in a fluid having a uniform appearance and broken gel fragments that were easily dispersed with minor agitation, regardless of which breaker was used. The other surfactants inhibited breaker action or produced gel fragments that agglomerated or were not easily dispersed.

Additional tests were carried out using the same general test procedure to determine the effectiveness of other dialkyl sulfosuccinates. The other dialkyl sulfosuccinates were a dialkyl sulfosuccinate wherein each alkyl group has 13 carbon atoms (ditridecyl sodium sulfosuccinate) and a dialkyl sulfosuccinate wherein each alkyl group has in the range of from 12 to 15 carbon atoms. An enzyme breaker, hemicellulase, was used. Each dialkyl sulfosuccinate was tested in an amount of 2.0% by weight based on the weight of the aqueous liquid.

The additional tests showed that the other dialkyl sulfosuccinates performed like the dioctyl sodium sulfosuccinate, e.g., they did not inhibit breaker action and resulted in a fluid having a uniform appearance and broken gel fragments that were easily dispersed with minor agitation.

EXAMPLE III

The dioctyl sulfosuccinate tested in Example II was further tested to demonstrate a range of operable concentrations.

Various samples of aqueous gel fluids employing the surfactant were first prepared. The samples were prepared by admixing an aqueous solution consisting of water and 2% by weight, based on the weight of the water, of potassium chloride ("the aqueous liquid") with 40 pounds per 1000 gallons of the aqueous liquid of hydroxypropylguar, a specific amount of a delayed titanate crosslinking agent, approximately 3% by volume based on the volume of the aqueous liquid diesel oil, approximately 0.25 gallons per 1000 gallons of the aqueous liquid of a pH buffer, a specific amount of a selected breaker and a specific amount of dioctyl sodium sulfosuccinate. In some samples, approximately 1 gallon per 1000 gallons of the aqueous liquid of a cationic fluoro surfactant and approximately 1 gallon per 1000 gallons of the aqueous liquid of a phenol-formaldehyde nonionic resin blend were also employed. The components were admixed using a Waring blender.

Each sample was placed in a jar which was placed in a water bath for a specific amount of time. The temperature of the water bath was adjusted according to the type of breaker used.

Following incubation (fluid breaking), the jars were removed from the water bath and observed visually. Each sample was analyzed for emulsion properties, fluid character, fluid color and broken gel fragment character. The results of the tests are shown in Tables 7-9 below.

TABLE 7

Breaker - Enzyme[1]
Water Bath - Overnight at 110° F.

| Surfactant | Surfactant Amount (Gal/Mgal) | Top Layer | Fluid Character | Fluid Color | Broken Gel Fragment Character |
|---|---|---|---|---|---|
| E[2] | 2 | ⅜" white | thin[3] | colorless | easily dispersed |
| E[2] | 5 | ⅜" white | thin[3] | colorless | easily dispersed |

TABLE 7-continued

Breaker - Enzyme[1]
Water Bath - Overnight at 110° F.

| Surfactant | Surfactant Amount (Gal/Mgal) | Top Layer | Fluid Character | Fluid Color | Broken Gel Fragment Character |
|---|---|---|---|---|---|
| E[2] | 10 | ¼" white | thin[3] | colorless | easily dispersed |

[1]hemicellulase
[2]dioctyl sodium sulfosuccinate
[3]The fluid was not viscous indicating a complete breakdown of the fluid had occurred.

TABLE 8

Breaker - Oxidizing[1]
Water Bath - Overnight at 185° F.

| Surfactant | Surfactant Amount (Gal/Mgal) | Top Layer | Fluid Character | Fluid Color | Broken Gel Fragment Character |
|---|---|---|---|---|---|
| E[2] | 2 | ¼" white | thin[3] | colorless | easily dispersed |
| E[2] | 5 | ¼" white | thin[3] | white | easily dispersed |
| E[2] | 10 | ¼" white | thin[3] | white | easily dispersed |

[1]sodium dioxypersulfate
[2]dioctyl sodium sulfosuccinate
[3]The fluid was not viscous indicating a complete breakdown of the fluid had occurred.

TABLE 9

Breaker - Oxidizing[1]
Water Bath - 2 hours at 185° F.
Additional Components Included[2]

| Surfactant | Surfactant Amount (Gal/Mgal) | Top Layer | Fluid Character | Fluid Color | Broken Gel Fragment Character |
|---|---|---|---|---|---|
| E[3] | 2 | ¼" white | thin[4] | white | easily dispersed |
| E[3] | 5 | ¼" white | thin[4] | white | easily dispersed |

[1]sodium dioxypersulfate
[2]These samples also included approximately one gallon per 1000 gallons of the aqueous liquid of a cationic fluoro surfactant and approximately one gallon per 1000 gallons of the aqueous liquid of a phenol-formaldehyde nonionic resin blend.
[3]dioctyl sodium sulfosuccinate
[4]The fluid was not viscous indicating a complete breakdown of the fluid had occurred.

The results of Tables 7-9 show that dioctyl sodium sulfosuccinate performed well at a concentration as low as 2 gallons per 1000 gallons of the aqueous liquid. The dioctyl sodium sulfosuccinate completely dispersed the oil droplets and the broken gel fragments.

EXAMPLE IV

The effect of the inventive gel fluid on the conductivity of a proppant pack was analyzed.

Various samples of aqueous gel fluids were first prepared. In each sample, a base fluid containing approximately 0.48% guar and water was buffered to a neutral pH with an acetate buffer and then crosslinked with zirconium lactate. A breaker, ammonium persulfate, and/or a broken gel fragment stabilizer, dioctyl sodium sulfosuccinate, were batch mixed into some of the samples.

Each sample was separately tested. A linear API conductivity cell containing two slabs of sandstone core was used to carry out the tests.

In each test, the sample was first preheated by pumping it into a core of stainless steel tubing at 180° F. The sample was then pumped into the conductivity cell.

Upon imposition of a pressure differential of 1000 psi across the core slabs, fluid loss occurred into the cores resulting in a buildup of gel filter cake on the core surfaces. After the filter cake was completed, an intermediate strength ceramic proppant was deposited into the cells at 2 lbs/ft$^2$ and a closure pressure of 6000 psi was applied to the cell. A period of 24 hours at 250° F. was given for the gel fluid to break.

Water was then flowed through the API cell and the flow rate was measured. The relative conductivity of the cell was determined by comparing the flow rate of water through the cell with the gel filter cake (the final flow rate) to the flow rate of water through a reference cell with no gel filter cake (proppant only) (the reference flow rate). The following formula was used:

relative conductivity =

$$\frac{\text{final flow rate (gel filter cake)}}{\text{reference flow rate (no gel filter cake)}} \times 100$$

The results of the tests are shown in Table 10 below.

TABLE 10

| Surfactant[1] | Surfactant Concentration (% by wt.)[2] | Breaker[3] | Breaker Concentration (lb/Mgal)[4] | Relative Conductivity (%) |
|---|---|---|---|---|
| no | — | no | — | 35 |
| yes | 0.5 | no | — | 46 |
| no | — | yes | 5 | 54 |
| yes | 0.25 | yes | 5 | 78 |
| yes | 0.5 | yes | 5 | 80 |

[1]dioctyl sodium sulfosuccinate
[2]The percent by weight of the surfactant based on the weight of the water used to form the gel fluid.
[3]ammonium persulfate
[4]Pounds of breaker used per 1000 gallons of the water used to form the gel fluid.

Table 10 shows that the addition of dioctyl sodium sulfosuccinate to the gel fluid clearly resulted in an improvement in the cell conductivity. The addition of a breaker further aided the removal of the gel from the proppant pack and enhanced conductivity.

Thus, the present invention is well adapted to carry out the objects and attain the ends and advantages mentioned as well as those which are inherent therein. The preceding examples can be repeated with similar success by substituting the generically or specifically described components and/or operating conditions of this invention for those used in the examples.

Furthermore, although certain preferred embodiments of the invention have been described for illustrative purposes, it will be appreciated that various modifications and innovations of the compositions and methods recited herein may be effected without departure from the basic principals which underlie the invention. Changes of this type are therefore deemed to lie within the spirit and scope of the invention except as may be necessarily limited by the appended claims and reasonable equivalents therefor.

What is claimed is:

1. A method of fracturing a subterranean formation penetrated by a well bore to stimulate the production of hydrocarbons therefrom comprising:
    contacting the formation with a gel fluid under conditions effective to create at least one fracture in said subterranean formation, said gel fluid including:
        an aqueous liquid;
        an organic gelling agent comprising at least one member selected from the group of guar, hydroxypropylguar, carboxymethylguar, carboxymethylhydroxyethylguar, carboxymethylhydroxypropylguar, hydroxyethylcellulose, carboxymethylhydroxyethylcellulose and carboxymethylhydroxypropylcellulose present in an amount sufficient to gel said aqueous liquid; and
    at least about 0.05% by weight, based on the weight of said aqueous liquid, of a broken gel fragment stabilizer, said broken gel fragment stabilizer being a dialkyl sulfosuccinate that has dispersing properties sufficient to diminish the propensity of broken gel fragments formed when said gel fluid breaks to agglomerate and prevent the fragments from being entrapped in the formation upon recovery of the fluid from the formation;
    breaking the gel fluid whereby broken gel fragments are produced in said aqueous liquid; and
    recovering at least a portion of the broken gel fluid including at least a portion of said broken gel fragments formed when the gel fluid breaks, from the formation.

2. The method of claim 1 wherein said aqueous liquid of said gel fluid is a salt solution.

3. The method of claim 1 wherein said gel fluid further comprises a breaker for breaking said organic gelling agent, said breaker being selected from the group consisting of oxidizing breakers and enzyme breakers.

4. The method of claim 1 wherein said gel fluid further comprises a crosslinking agent.

5. The method of claim 4 wherein said crosslinking agent is selected from the group consisting of zirconium IV containing compounds, boron compounds and titanium IV containing compounds.

6. The method of claim 1 wherein said broken gel fragment stabilizer of said gel fluid is a dialkyl sulfosuccinate wherein each alkyl group has from 5 to 18 carbon atoms.

7. The method of claim 6 wherein said broken gel fragment stabilizer is a dialkyl sulfosuccinate wherein each alkyl group has from 8 to 15 carbon atoms.

8. The method of claim 7 wherein said broken gel fragment stabilizer is a dioctyl sulfosuccinate.

9. The method of claim 1 wherein said broken gel fragment stabilizer of said gel fluid is present in said fluid in an amount in the range of from about 0.05% to about 2% by weight, based on the weight of said aqueous liquid.

10. The method of claim 9 wherein said broken gel fragment stabilizer is present in said gel fluid in an amount in the range of from about 0.1% to about 0.5% by weight, based on the weight of said aqueous liquid.

11. In a method of fracturing a subterranean formation penetrated by a well bore to stimulate the production of hydrocarbons therefrom including the steps of (a) introducing a gel fluid prepared by admixing proppant material and an organic gelling agent with an aqueous liquid into the formation at a rate and pressure sufficient to form a fracture in the formation and deposit proppant material in the fracture, (b) breaking the gel fluid and (c) recovering the broken gel fluid from the formation, the improvement comprising:

admixing, when said organic gelling agent comprises at least one member selected from the group of guar, hydroxypropylguar, carboxymethylguar, carboxymethylhydroxyethylguar, carboxymethylhydroxypropylguar, hydroxyethylcellulose, carboxymethylhydroxyethylcellulose and carboxymethylhydroxypropylcellulose, at least about 0.05% by weight, based on the weight of the aqueous liquid used to prepare the gel fluid, of a broken gel fragment stabilizer with the gel fluid prior to introducing the fluid into the formation, said broken gel fragment stabilizer being a dialkyl sulfosuccinate that has dispersing properties sufficient to diminish the propensity of broken gel fragments formed when the gel fluid breaks to agglomerate and thereby prevent the fragments from being entrapped by the proppant material upon recovery of at least a portion of the broken gel fluid and broken fragments from the formation.

12. The method of claim 11 wherein said broken gel fragment stabilizer is a dialkyl sulfosuccinate wherein each alkyl group has from 5 to 18 carbon atoms.

13. The method of claim 12 wherein said broken gel fragment stabilizer is a dialkyl sulfosuccinate wherein each alkyl group has from 8 to 15 carbon atoms.

14. The method of claim 13 wherein said broken gel fragment stabilizer is a dioctyl sulfosuccinate.

15. The method of claim 11 wherein said broken gel fragment stabilizer is admixed with the gel fluid in an amount in the range of from about 0.05% to about 2% by weight, based on the weight of the aqueous liquid used to prepare the gel fluid.

16. The method of claim 15 wherein said broken gel fragment stabilizer is admixed with the gel fluid in an amount in the range of from about 0.1% to about 0.5% by weight, based on the weight of the aqueous liquid used to prepare the gel fluid.

* * * * *